(12) United States Patent
Kimura et al.

(10) Patent No.: US 8,356,043 B2
(45) Date of Patent: Jan. 15, 2013

(54) FILE MANAGEMENT METHOD (75) Inventors: Masatoshi Kimura, Kawasaki (JP);
Yuichi Kawada, Kawasaki (JP);
Yumiko Nakamura, Kawasaki (JP);
Kanako Ariya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 265 days.

(21) Appl. No.: 11/877,885

(22) Filed: Oct. 24, 2007

(65) Prior Publication Data

US 2008/0086461 A1 Apr. 10, 2008

Related U.S. Application Data (63) Continuation of application No. PCT/JP2005/007852, filed on Apr. 25, 2005.

(51) Int. Cl.
*G06F 17/30* (2006.01)

(52) U.S. Cl. ....................................................... 707/758

(58) Field of Classification Search .................. None
See application file for complete search history.

(56) References Cited

U.S. PATENT DOCUMENTS

| | | | | |
|---|---|---|---|---|
| 5,995,630 | A * | 11/1999 | Borza | 380/54 |
| 6,289,114 | B1 | 9/2001 | Mainguet | 382/124 |
| 6,459,804 | B2 | 10/2002 | Mainguet | 382/124 |
| 2003/0185425 | A1 | 10/2003 | Nishikawa | 382/124 |
| 2003/0194114 | A1* | 10/2003 | Mitsuyu et al. | 382/124 |
| 2003/0197593 | A1* | 10/2003 | Siegel et al. | 340/5.52 |
| 2004/0170306 | A1* | 9/2004 | Miyazaki | 382/124 |
| 2004/0236954 | A1* | 11/2004 | Vogt et al. | 713/186 |
| 2005/0154920 | A1* | 7/2005 | Tartaglia et al. | 713/201 |
| 2005/0264398 | A1* | 12/2005 | Siegel et al. | 340/5.52 |
| 2005/0271259 | A1 | 12/2005 | Lorch | |

FOREIGN PATENT DOCUMENTS

| | | |
|---|---|---|
| CN | 1172308 | 2/1998 |
| CN | 1435795 A | 8/2003 |
| DE | 102 54 614 | 6/2004 |
| JP | 03-176719 | 7/1991 |
| JP | 6-52032 | 2/1994 |
| JP | 10-91769 | 4/1998 |
| JP | 10-154131 | 6/1998 |
| JP | 10-269145 | 10/1998 |
| JP | 10-293833 | 11/1998 |
| JP | 2000-358025 | 12/2000 |
| JP | 2001-51949 | 2/2001 |
| JP | 2001-350726 | 12/2001 |
| JP | 2003-132626 | 5/2003 |
| JP | 2003-288160 | 10/2003 |

(Continued)

OTHER PUBLICATIONS

Becker, R., *Fingerprint Recognition by Strip Sensor*, Electronik Industrie, Sep. 2002, pp. 34-35.

(Continued)

*Primary Examiner* — Yuk Ting Choi
(74) *Attorney, Agent, or Firm* — Staas & Halsey LLP (57) ABSTRACT

There is provided a technique for facilitating file marking by adding attribute information to the file according to read of biometric information. Biometric information is read from a living body moving and attribute information abased on the biometric information is added to the file. According to the biometric information which has been read, the direction of the movement of the living body is judged. When the movement direction coincides with a predetermined direction, the file is searched according to the biometric information.

14 Claims, 8 Drawing Sheets

FOREIGN PATENT DOCUMENTS

| | | |
|---|---|---|
| JP | 2003-298689 | 10/2003 |
| JP | 2004-38870 | 2/2004 |
| JP | 2005-4517 | 1/2005 |
| WO | 03/060622 A2 | 7/2003 |

OTHER PUBLICATIONS

Official Action, mailed Apr. 28, 2009, in corresponding German Patent Application No. 11 2005 003 557.3-53 (8 pp.).

International Search Report dated Aug. 16, 2005 in PCT Application No. PCT/JP2005/007852 (4 pages).

International Preliminary Report on Patentability in corresponding PCT Application No. PCT/JP2005/007852 (7 pages).

Japanese Patent Office Notice of Reason for Rejection dated Jul. 27, 2010 for corresponding Japanese Patent Application No. 2007-514404.

Chinese Office Action issued May 25, 2011 in corresponding Chinese Patent Application 200910205867.X.

Chinese Office Action for Application No. 200910205867.X issued May 14, 2012.

\* cited by examiner

FILE MANAGEMENT METHOD

CROSS-REFERENCE TO RELATED APPLICATION

This is a continuation of Application PCT/JP2005/007852, filed on Apr. 25, 2005, now pending, the contents of which are herein wholly incorporated by reference.

BACKGROUND OF THE INVENTION

The present invention relates to a technology of conducting file management according to biometric information.

In the case of storing a file in an area shared with a plurality of users, a process such as searching for the file has hitherto been executed in a way that registers an associative relation between the user and the file.

Particularly, in the case of setting usage authorization such as reading, writing and deleting the file, an in-depth associative relation with the user was registered for every usage authorization.

Further, technologies disclosed in the following Patent documents are given are the prior arts related to the invention of the present application.

PATENT DOCUMENT 1

Japanese Patent Application Laid-Open Publication No. 03-176719

PATENT DOCUMENT 2

Japanese Patent Application Laid-Open Publication No. 2003-288160

PATENT DOCUMENT 3

Japanese Patent Application Laid-Open Publication No. 2003-298689

PATENT DOCUMENT 4

Japanese Patent Application Laid-Open Publication No. 2004-38870

PATENT DOCUMENT 5

Japanese Patent Application Laid-Open Publication No. 10-91769

PATENT DOCUMENT 6

Japanese Patent Application Laid-Open Publication No. 10-269145

PATENT DOCUMENT 7

Japanese Patent Application Laid-Open Publication No. 2001-350726

PATENT DOCUMENT 8

Japanese Patent Application Laid-Open Publication No. 2003-132626

PATENT DOCUMENT 9

Japanese Patent Application Laid-Open Publication No. 10-154131

PATENT DOCUMENT 10

Japanese Patent Application Laid-Open Publication No. 2000-358025

SUMMARY OF THE INVENTION

As described above, the registration of the associative relation between the user and the file generally involves inputting items of information for specifying the user such as a user name and a password (which will hereinafter be simply termed identifying information) for every target file, and registering these items of identifying information on a one-by-one basis.

With spread of personal computers etc. attached with digital cameras, semiconductor audio equipment and TV tuners, a tendency is that a quantity (data size) of the files treated by users on a daily basis rises, and it is a quite time-consuming operation to register each piece of identifying information by selecting a necessary file from within a large quantity of files.

Moreover, setting of file usage authorization entails conducting in-depth registration by displaying a menu etc. for setting, with the result that the operability goes under an acceptable level.

Such being the case, the present invention provides a technology that facilitates file marking by adding attribute information to the file, corresponding to a state of reading the biometric information.

The present invention adopts the following configurations in order to solve the problems.

Namely, a file management device according to the present invention comprises: reading means reading biometric information of a body that moves; and attribute adding means adding attribute information based on the biometric information to a file.

The reading means may be means that sequentially reads the biometric information as the body moves.

The reading means may be a linear sensor and may also be means that sequentially linearly reads the information of the body moving in a direction orthogonal to a longitudinal portion of the sensor.

Further, a file management device according to the present invention comprises: reading means reading biometric information of a body that moves; determining means determining a moving direction of the body on the basis of the biometric information read by the reading means; and searching means searching for, if the moving direction is coincident with a predetermined direction, a file on the basis of the biometric information.

The searching means may search for, if the moving direction is coincident with the predetermined direction, a file to which attribute information based on the biometric information is added, and may search for, whereas if the moving direction is different from the predetermined direction, a file to which attribute information based on biometric information other than the former biometric information is added.

A file management method according to the present invention comprises: a step of reading biometric information of a body that moves; and a step of adding attribute information based on the biometric information to a file.

The biometric information reading step may include sequentially reading the biometric information as the body moves.

The biometric information reading step may include sequentially linearly reading the information of the body moving in a direction orthogonal to a longitudinal portion of a linear sensor.

Still further, a file management method according to the present invention comprises: a step of reading biometric information of a body that moves; a step of determining a moving direction of the body on the basis of the biometric information read in the biometric information reading step; and a step of searching for, if the moving direction is coincident with a predetermined direction, a file on the basis of the biometric information.

The file management method may further comprise: a step of determining a moving direction of the body on the basis of the biometric information read in the biometric information reading step; and a step of searching for, if the moving direction is coincident with the predetermined direction, a file to which attribute information based on the biometric information is added, and searching for, whereas if the moving direction is different from the predetermined direction, a file to which attribute information based on biometric information other than the former biometric information is added.

Yet further, the present invention may also be a file management program for making a computer execute the file management method. Moreover, the present invention may also be a readable-by-computer recording medium recorded with the file management program. The computer reads and executes the program on the recording medium, whereby the function thereof can be provided.

Herein, the readable-by-computer recording medium connotes a storage medium capable of storing information such as data and programs electrically, magnetically, optically, mechanically or by chemical action, which can be read from the computer. Among these storage mediums, for example, a flexible disc, a magneto-optic disc, a CD-ROM, a CD-R/W, a DVD, a DAT, an 8 mm tape, a memory card, etc. are given as those demountable from the computer.

Further, a hard disc, a ROM (Read-Only Memory), etc. are given as the storage mediums fixed within the computer.

EFFECTS OF THE INVENTION

According to the present invention, it is feasible to provide the technology that facilitates file marking by adding the attribute information to the file, corresponding to the state of reading the biometric information.

DETAILED DESCRIPTION OF THE PREFERRED EMBODIMENT

Figure 1:
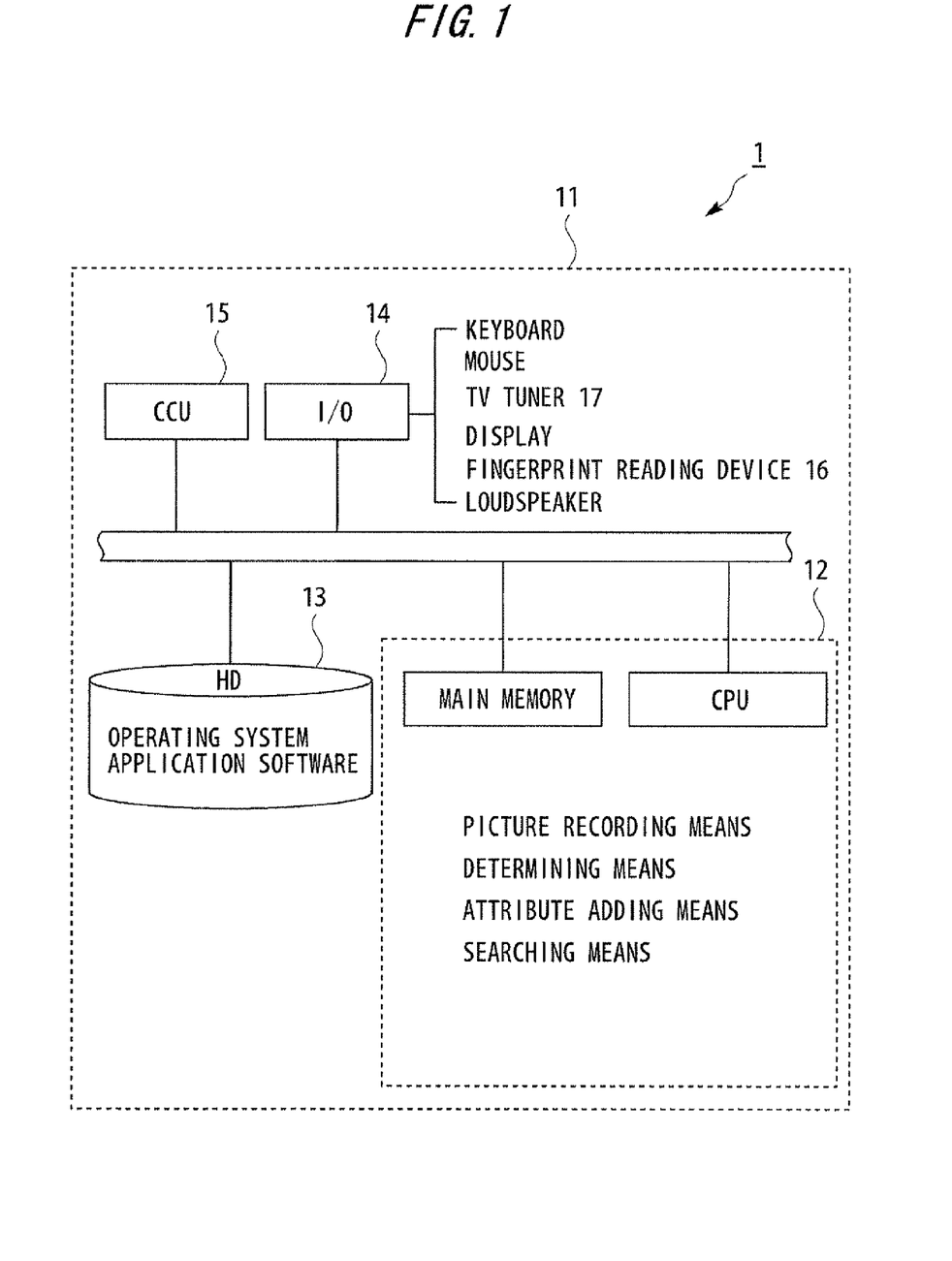
FIG. 1 is a function block diagram of a file management device.
Figure 2:
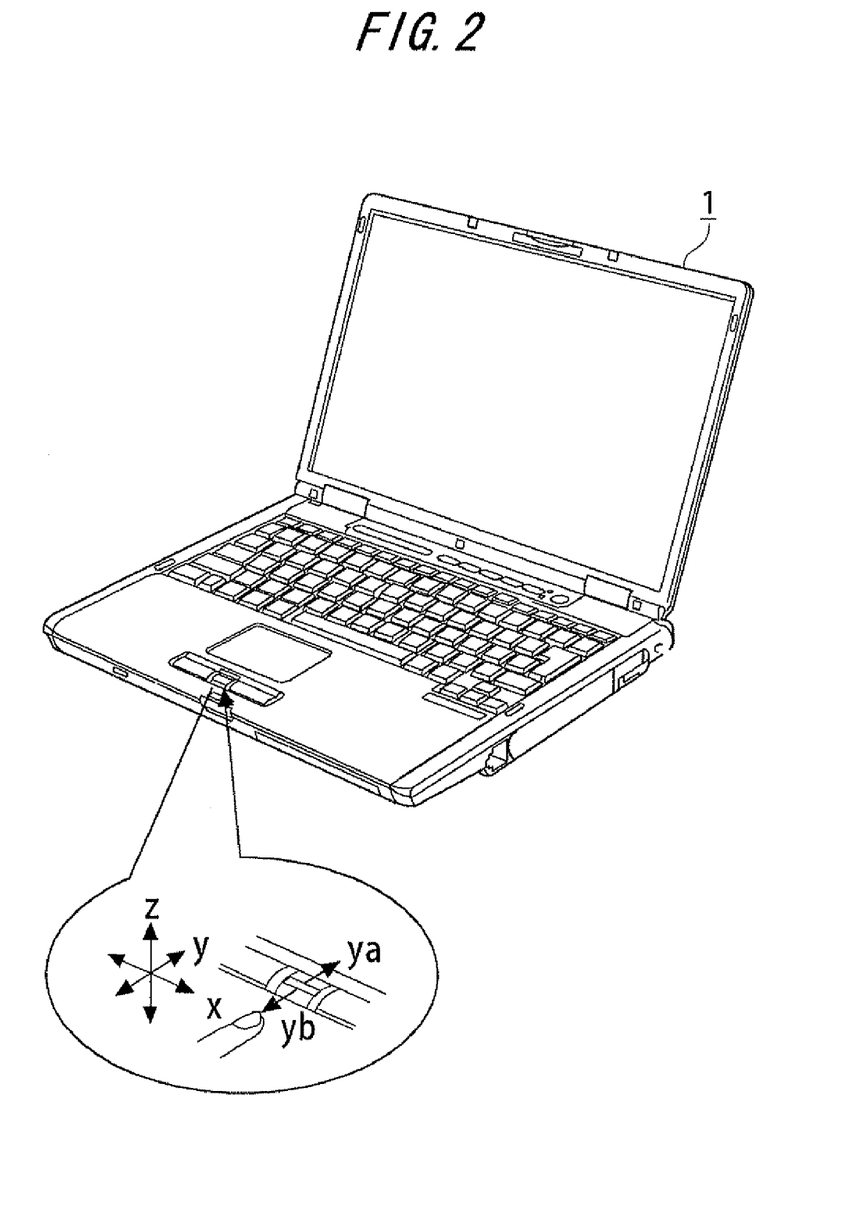
FIG. 2 is an explanatory diagram of a fingerprint reading device.

FIG. 1 is an outline drawing of an information processing device (computer) functioning as a file management device of the present invention, and FIG. 2 is an outline drawing of the computer.

A computer 1 is a notebook type personal computer (which will hereinafter be also abbreviated to a notebook PC), and includes an arithmetic processing unit 12 constructed of a CPU (Central Processing Unit), a main memory, etc, a storage unit (hard disk) 13 stored with data and software for the arithmetic process, an input/output port 14, a communication control unit (CCU) 15, etc within a housing 11.

Connected properly to the I/O port 14 are input devices such as a keyboard, a mouse, a CD-ROM drive, a fingerprint reading unit (reading means) 16 and a TV tuner 17 and output devices such as a display device and a printer.

The TV tuner 17 receives TV broadcasts via radio waves and a cable from a broadcasting station, and detects a desired TV program.

The fingerprint reading unit 16 is, as illustrated in FIG. 2, a linear image sensor provided in the vicinity of the keyboard. The fingerprint reading unit 16 is built up by arranging photoelectric converting elements in lines such as CCDs (Charge Coupled Devices) and C-MOSs (Complementary Metal Oxide Semiconductors), wherein an image of a user's finger "U" placed on a detection surface (which is substantially flush with an external surface of the housing 11 in this embodiment) is formed on light receiving surfaces of the photoelectric converting elements. With this configuration, when the user slides the finger "U" in a longitudinal direction x and in an orthogonal direction y in a state where the finger "U" is brought into contact with the detection surface of the fingerprint reading unit 16, the photoelectric converting elements sequentially convert the image of the fingerprint of the finger "U" into electronic data, thereby obtaining fingerprint information (biometric information) thereof. Further, the detection of the finger in the slide direction involves arranging plural strings of photoelectric converting elements at an interval of a predetermined distance in the y-direction and reading the image at two points simultaneously.

The CCU 15 controls communications with other computers via a network.

The storage means 13 is preinstalled with operating system (OS) and application software (a file management program etc). Further, the storage means 13 is stored with a data table that retains pieces of user's fingerprint information read by the fingerprint reading unit 16 and unique management numbers in a way that associates these items of information with each other.

The arithmetic processing unit 12 properly reads the OS and the application program from the storage means 13, then executes the OS and the application program, and performs the arithmetic process about the information inputted from the I/O port 14 and from the CCU 15 and also the information read from the storage means 13, thereby functioning as a picture recording means, a determining means, an attribute adding means and a searching means.

The picture recording means encodes the TV program received by the TV tuner 17 into a file in a predetermined format such as MPEG (Moving Picture Experts Group) and stores the encoded file in the storage means 13.

The determining means determines a moving direction of a body on the basis of the biometric information read by the reading means. Note that any one of the known technologies may be chosen as a determining method, however, the method in the present embodiment is that the pieces of fingerprint information read simultaneously at the two points in the y-direction are compared with each other, and the moving direction is determined based on which point the fingerprint information is read at with a delay.

The attribute adding means adds, based on the biometric information, attribute information specifying which user conducted the picture recording, to the recorded file.

The searching means searches for the file having the addition of the attribute information based on the biometric information if the moving direction of the body is coincident with a predetermined direction, and searches for a file having an addition of another piece of attribute information based on biometric information other than the former biometric information whereas if the moving direction is different from the predetermined direction. Namely, a scheme in the present embodiment entails searching for the file recorded by the user when the user slides the finger downward, and searching for a file recorded by a person other than the user concerned when the user slides the finger upward.

Next, the file management method executed on the notebook PC 1 having this configuration will be described with reference to FIGS. 3 through 8.

<Recording Reservation Method>

Figure 4:
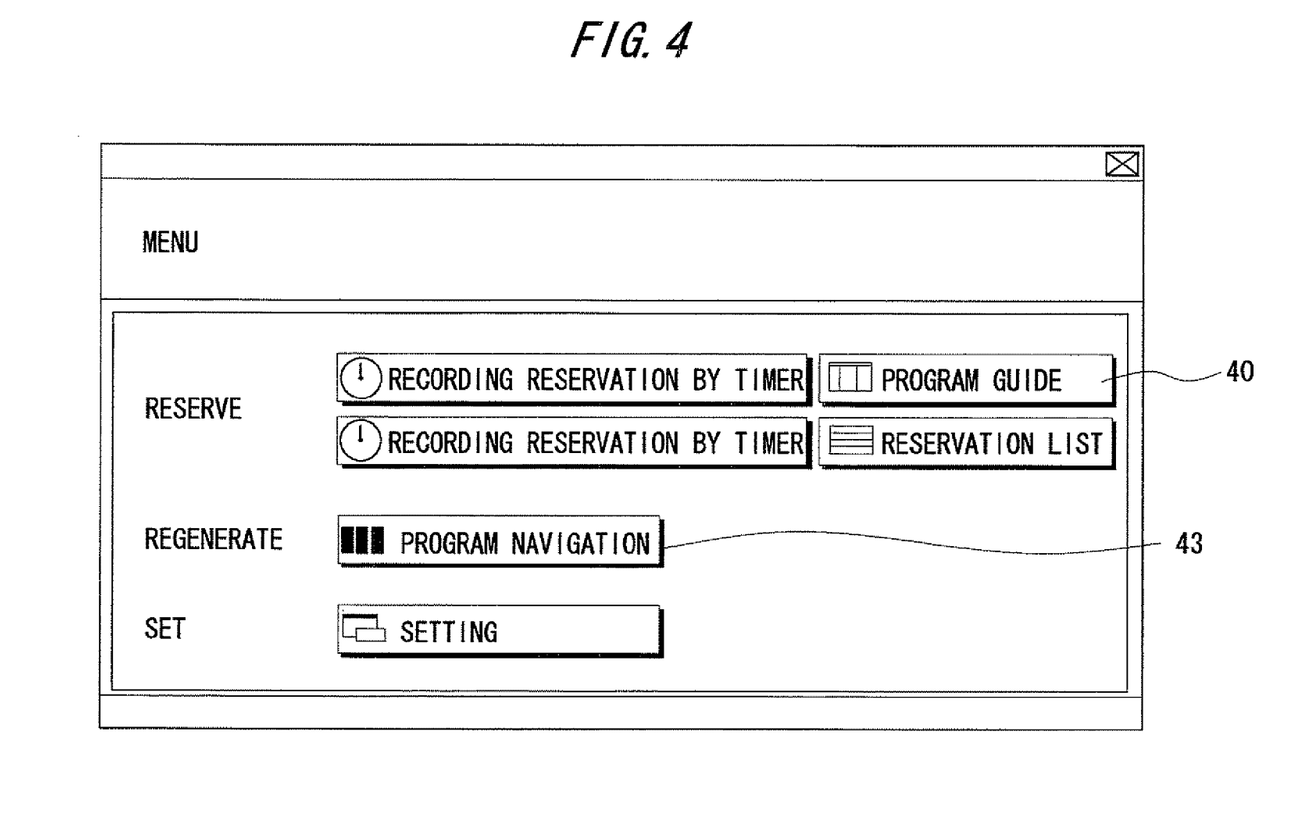
FIG. 4 is a diagram showing an example of a reservation screen.

The notebook PC 1, when starting up the application program for recording in accordance with a user's operation (step 1, which will hereinafter also be abbreviated such as S1), to begin with, displays a menu screen illustrated in FIG. 4.

Figure 5:
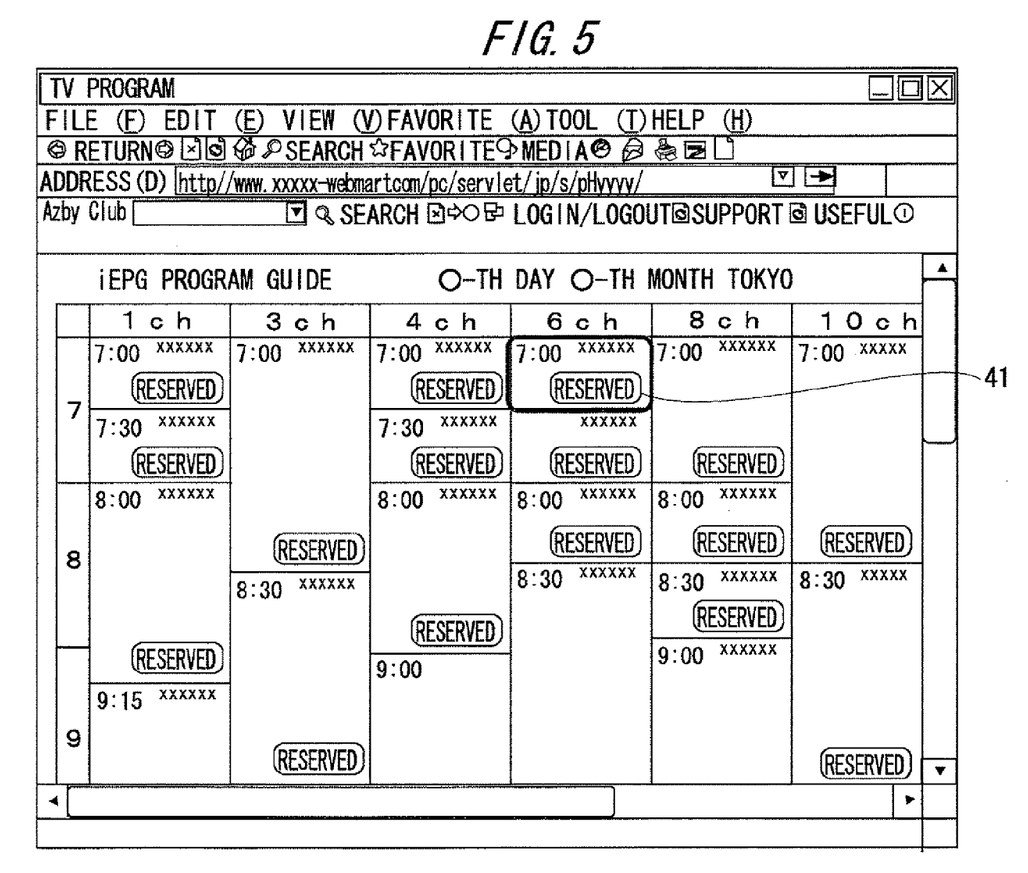
FIG. 5 is an explanatory diagram of an electronic program guide.
Figure 6:
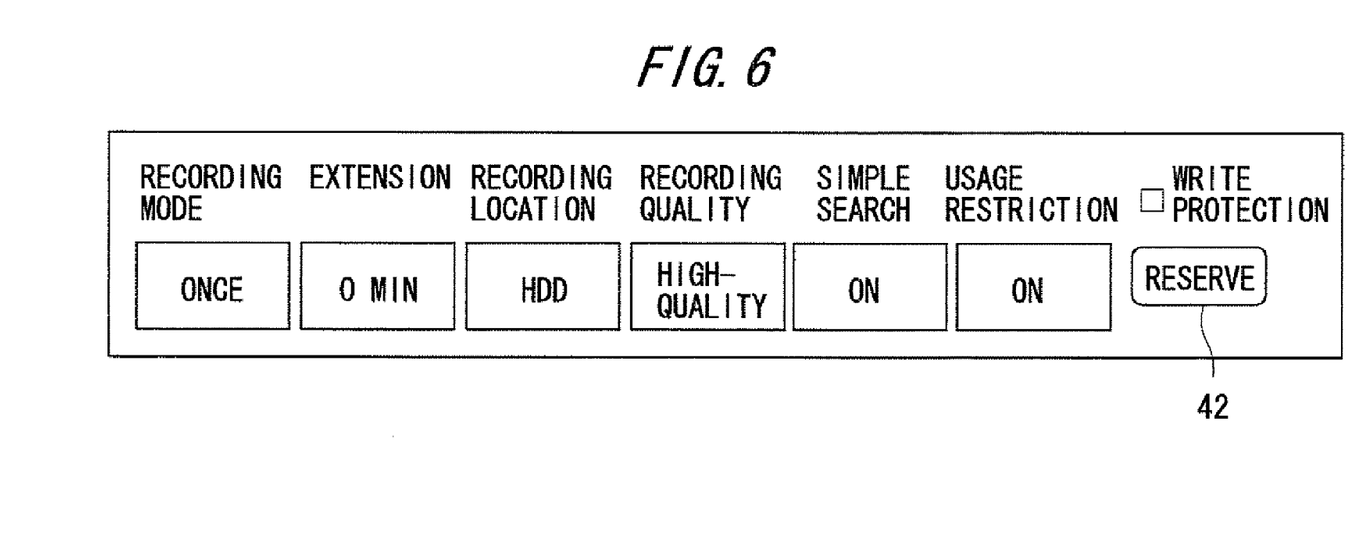
FIG. 6 is an explanatory diagram of an in-depth setting screen.

Then, when an electronic program guide 40 is selected, the notebook PC 1 displays the electronic program guide illustrated in FIG. 5 through a function of the recording means (S2).

When the user selects a want-to-record program 41, the recording means accepts this selection and acquires items of information such as recording start time, recording end time and a channel of the program 41 from a server via a network (S3).

Next, the recording means gets an option selecting screen (FIG. 6) displayed and prompts the user to make detailed options about recording such as a picture quality of recording, write protection setting and a simple search (S4). For example, if marking is done to enable the recorded file to be simply searched for, the simple search is set ON, and, whereas if marking is not done, the simple search is set OFF.

Figure 3:
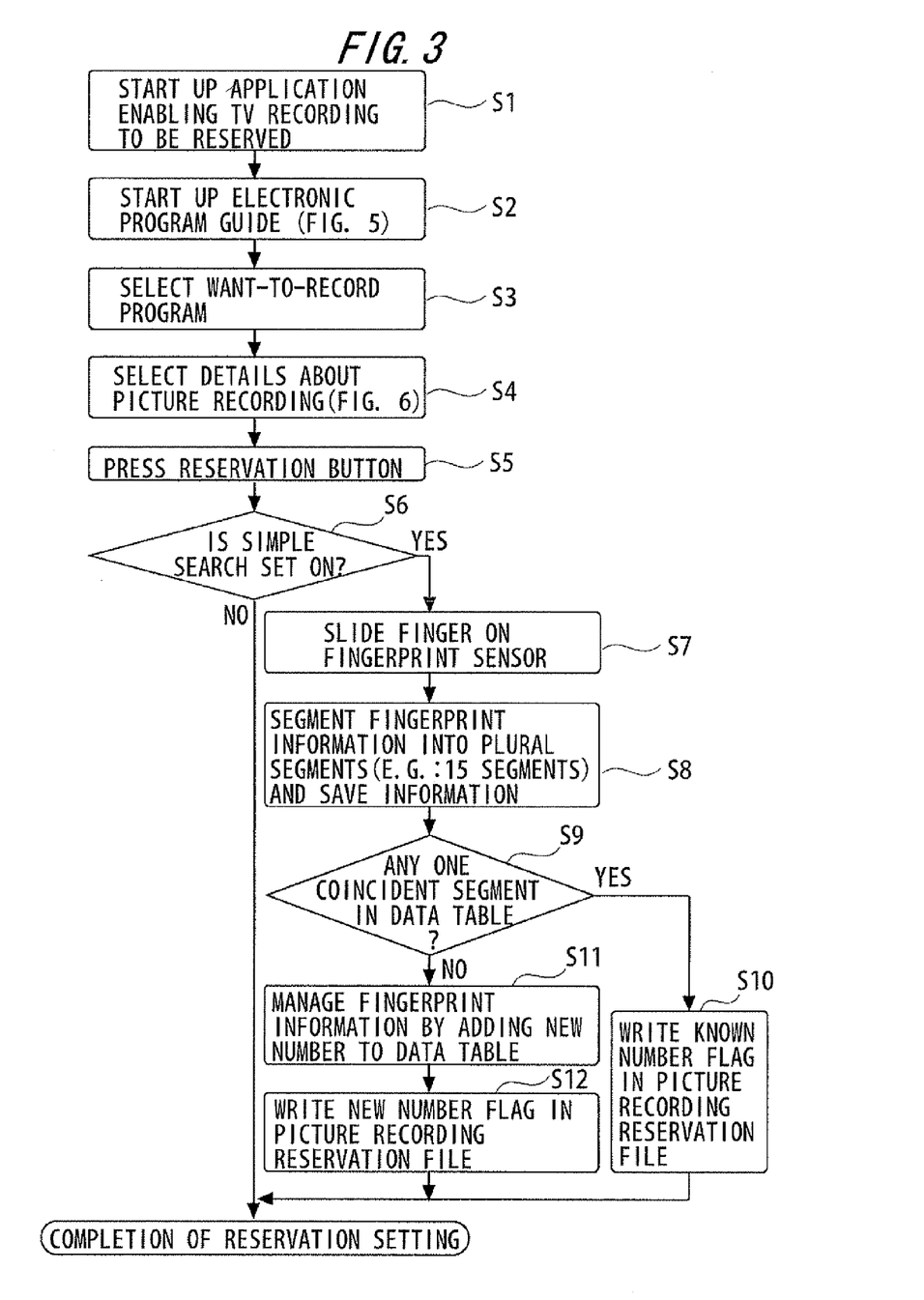
FIG. 3 is an explanatory diagram of a picture recording reservation method.

Then, when detecting that a reservation button 42 is pressed (selected) (S5), the recording means determines whether the simple search is set ON or not (S6). If the simple search is set ON, the recording means displays a message that prompts the user to input the fingerprint, and, when the user slides the finger on the fingerprint reading unit 16, reads the fingerprint of this finger (S7). The recording means segments the thus-read fingerprint information into a plurality of segments (15 segments in the present embodiment) (S8), and determines by referring to the data table in the storage means 13 whether there is a coincident segment or not (S9) If there is the coincident segment, the management number associated with this segment is read out and stored as a recording reservation file together with the information acquired in steps 3-4 in the storage means 13. Further, if the read fingerprint information is not coincident in step 9, the fingerprint information is registered in the way of its being associated with the management number (S11), and the information acquired in steps 3-4 is stored as the recording reservation file together with this management number in the storage means 13 (S12).

<Recording Starting and Ending Method>

Figure 7:
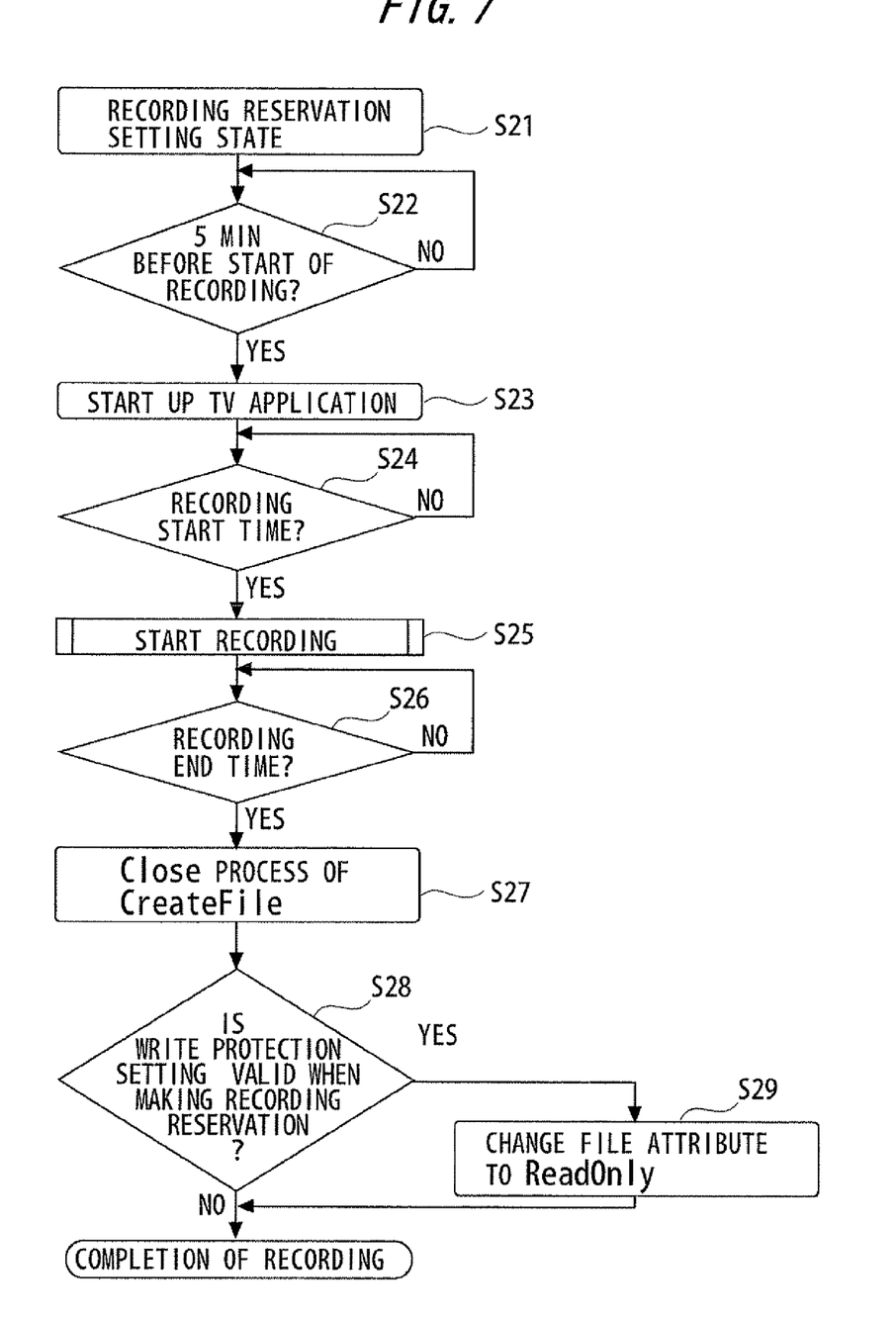
FIG. 7 is an explanatory diagram of a picture recording method.

As illustrated in FIG. 7, the recording reservation is set, and a standby status is set (S21), in which case the recording means determines whether or not it reaches 5 minutes before recording start time (S22), and, if it is 5 min before, starts up the TV application program (S23). Moreover, the recording means determines whether or not it reaches recording start time (S24) and, if it reaches the recording start time, starts recording the TV program (S25).

Then, the recording means determines whether or not it is recording end time (S26) and, if it reaches the recording end time, executes a closing process of the recorded file. At this time, if the simple search is set ON, the management number is added as the attribute information to the file. Here at, as to the addition of the attribute information, the attribute information may be included directly in the file and may also be stored in the data table in a way that associates the attribute information with information enabling the file to be specified, such as a path name of the file.

Further, the recording means determines whether or not the write protection setting is selected when making the recording reservation (S28) and, if the write protection setting is selected, changes the attribute of the file to "read-only" (S29).

<Recording Program Watching/Listening Method>

Figure 8:
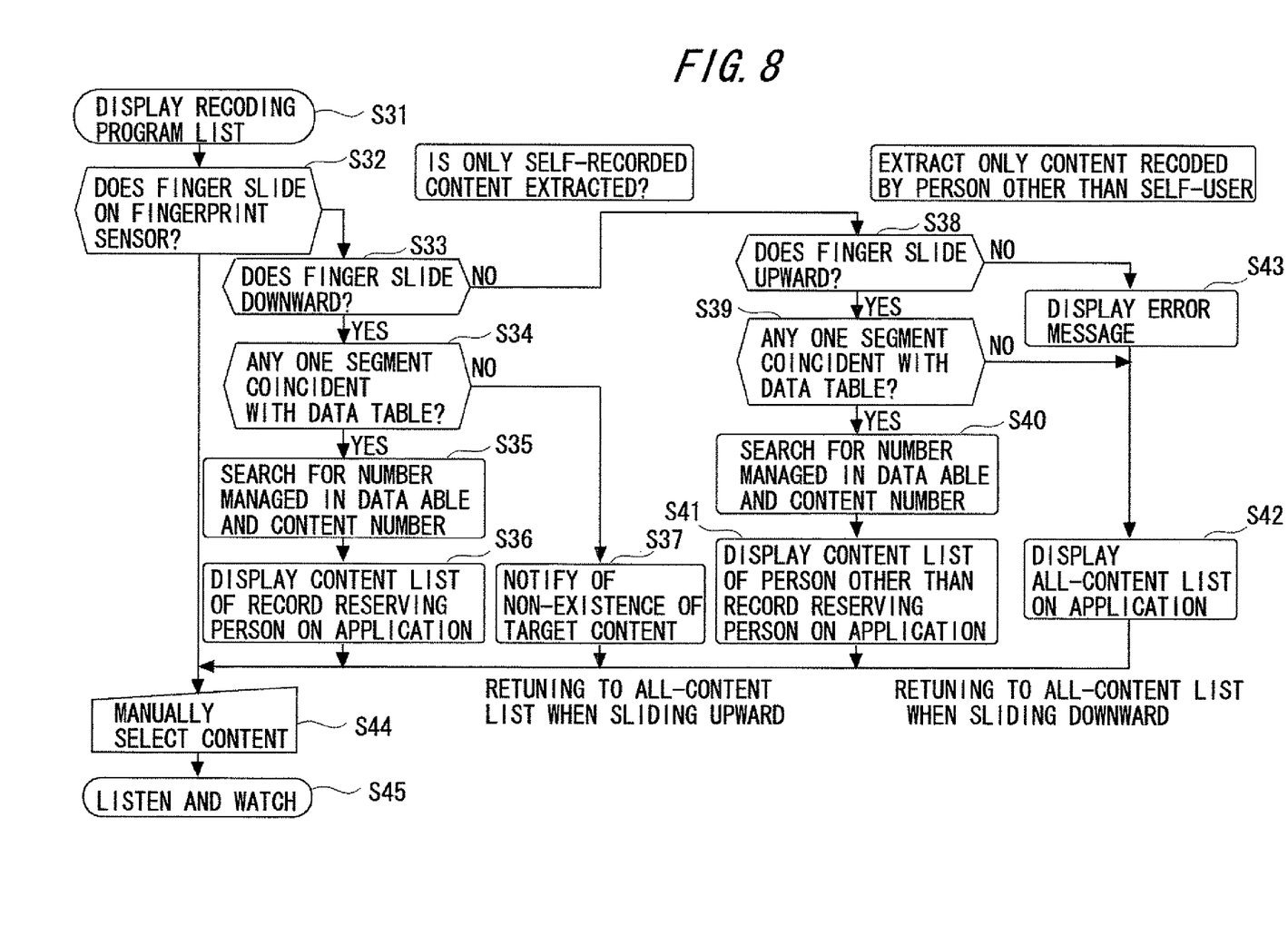
FIG. 8 is an explanatory diagram of a watching/listening method.

As shown in FIG. 8, when the user selects a program navigation (moving picture program list display) 43 from on the menu screen, the notebook PC 1 displays a message for prompting the user to input the fingerprint and, when the user slides the finger on the fingerprint reading unit 16, reads the fingerprint of the finger (S32).

The determining means determines based on the read fingerprint information whether or not the user slides the finger downward (in a yb-direction) (S33).

When slid downward, the searching means determines by referring to the data table whether the fingerprint information is coincident or not (S34), then obtains the management number associated with the fingerprint information if coincident, lists up (searches out) a content (file) to which the management number is added (S35), and displays this list as the content list of the user on the application (S36). Whereas if the fingerprint information is not coincident with any information in the data table in step 34, displays that none of the target content exists (S37).

Moreover, the determining means, when determining in step 33 that the finger "U" is not slid downward, determines whether or not the finger "U" is slid upward (in a ya-direction) (S38).

When slid upward, the searching means determines by referring to the data table whether the fingerprint information is coincident or not (S39), then obtains the management number associated with the fingerprint information if coincident, lists up (searches out) contents (files) to which management numbers other than the former management number are added (S40), and displays this list as a content list for other users on the application (S41). Whereas if the fingerprint information is not coincident with any information in the data table in step 39, all of the contents are displayed as a list on the application (S42).

Further, when the determining means determines that the finger "U" is not slid upward, after displaying an error message (S43), all of the contents are displayed as the list on the application (S42).

When the user selects a desired content from the list (S44), the arithmetic processing unit 12 regenerates the content (S45).

As described above, according to the present embodiment, the marking can be done to specify who made the recording reservation. Further, on the occasion of regenerating the file, the list of the user concerned and the lists of other persons can be displayed simply by changing the sliding direction of the finger, which eliminates a necessity of an ID number and a password each time, whereby the operability can be improved.

<Others>

The present invention is not limited to only the illustrated examples given above and can be, as a matter of course, changed in a variety of forms in the range that does not deviate from the gist of the present invention.

For example, on the occasion of making the reservation, the moving direction of the finger is acquired from the fingerprint information read in step 7, and a usage authorized scheme may be set such as inhibiting the persons other than the user concerned from browsing if slid upward and enabling other users to browse but inhibiting deletion if slid downward. Moreover, in the case of inhibiting the persons other than the user concerned from browsing, the file existence itself may be concealed from other users by saving the file in an encrypted private area.

What is claimed is:

1. A file management device comprising:
    a reading unit to read biometric information of a body and to detect a moving direction of the body;
    one or more processors configured to:
    register a first biometric information of a body of a first user read by the reading unit in a storage device;
    add attribute information based on the first biometric information to a first file;
    judge whether or not a second biometric information of the body of the first user read by the reading unit is coincident with the first biometric information;
    determine whether the moving direction of the body for the reading unit in a reading operation based on the second biometric information is a first moving direction or a second moving direction when the second biometric information is coincident with the first biometric information, the first moving direction is a direction that the body moves toward a first direction from a second direction and the second moving direction is a direction that the body moves toward the second direction from the first direction;
    search the first file associated with the attribute information when the moving direction of the body is the first moving direction while search a second file when the moving direction of the body is the second moving direction, the second file being different from the first file; and
    a display unit to display, when the second biometric information is not coincident with the first biometric information, a list of accessible files.

2. The file management device according to claim 1, wherein said reading unit sequentially reads the biometric information of the body of user as the body moves.

3. The file management device according to claim 1, wherein said reading unit is a linear sensor and sequentially linearly reads the biometric information of the body of user moving in a direction orthogonal to a longitudinal portion of said sensor.

4. The file management device according to claim 1, wherein the biometric information is fingerprint information.

5. A file management method comprising:
    registering a first biometric information of a body of a first user in a storage device;
    adding attribute information based on the first biometric information to a first file;
    judging whether or not a second biometric information of the body of the first user read by a reading unit is coincident with the first biometric information;
    determining whether a moving direction of the body in a reading operation based on the second biometric information is a first moving direction or a second moving direction when the second biometric information is coincident with the first biometric information, the first moving direction is a direction that the body moves toward a first direction from a second direction and the second moving direction is a direction that the body moves toward the second direction from the first direction;
    searching, by a computer, the first file associated with the attribute information when the moving direction of the body is the first moving direction while search a second file when the moving direction of the body is the second moving direction, the second file being different from the first file; and
    displaying, when the second biometric information is not coincident with the first biometric information, a list of accessible files.

6. The file management method according to claim 5, wherein said reading unit sequentially reads a biometric information of body of user as the body moves.

7. The file management method according to claim 5, wherein said reading unit is a linear sensor and sequentially linearly reads a biometric information of the body of user moving in a direction orthogonal to a longitudinal portion of a linear sensor.

8. The file management method according to claim 5, wherein the biometric information is fingerprint information.

9. The file management method according to claim 5, further comprising:
    displaying, when the second biometric information is not judged by the judging to be coincident with the first biometric information, a list of accessible files.

10. A non-transitory computer-readable storage medium on which is recorded a file management program making a computer execute processes comprising:
    registering a first biometric information of a body of a first user in a storage device;
    adding attribute information based on the first biometric information to a first file;
    judging whether or not a second biometric information of the body of the first user read by a reading unit is coincident with the first biometric information;
    determining whether a moving direction of the body in a reading operation based on the second biometric information is a first moving direction or a second moving direction when the second biometric information is coincident with the first biometric information, the first moving direction is a direction that the body moves toward a first direction from a second direction and the second moving direction is a direction that the body moves toward the second direction from the first direction;
    searching, by a computer, the first file associated with the attribute information when the moving direction of the body is the first moving direction while search a second file when the moving direction of the body is the second moving direction, the second file being different from the first file; and displaying, when the second biometric information is not coincident with the first biometric information, a list of accessible files.

11. The non-transitory computer-readable storage medium according to claim 10, wherein said reading unit sequentially linearly reads a information of the body of user as the body moves.

12. The non-transitory computer-readable storage medium according to claim 10, wherein said reading unit is a linear sensor and sequentially linearly reads a biometric information of the body of user moving in a direction orthogonal to a longitudinal portion of a linear sensor.

13. The non-transitory computer-readable storage medium according to claim 10, wherein the biometric information is fingerprint information.

14. The non-transitory computer-readable storage medium according to claim 10, further comprising:

displaying, when the second biometric information is not judged by the judging to be coincident with the first biometric information, a list of accessible files.

\* \* \* \* \*

UNITED STATES PATENT AND TRADEMARK OFFICE
CERTIFICATE OF CORRECTION

| | |
|---|---|
| PATENT NO. | : 8,356,043 B2 |
| APPLICATION NO. | : 11/877885 |
| DATED | : January 15, 2013 |
| INVENTOR(S) | : Masatoshi Kimura et al. |

Page 1 of 1

It is certified that error appears in the above-identified patent and that said Letters Patent is hereby corrected as shown below:

On the Title Page Item [57]; Line 4, Delete "abased" and insert -- based --, therefor.

Signed and Sealed this
Fourth Day of June, 2013

Teresa Stanek Rea
*Acting Director of the United States Patent and Trademark Office*